118,296

UNITED STATES PATENT OFFICE.

WILLIAM M. STUART, OF PORT HURON, ASSIGNOR TO HIMSELF AND ALEXANDER CHISHOLM, OF SMITH'S CREEK, MICHIGAN.

IMPROVEMENT IN COMPOSITIONS FOR ROOFING, PAVING, &c.

Specification forming part of Letters Patent No. 118,296, dated August 22, 1871.

*To all whom it may concern:*

Be it known that I, WILLIAM M. STUART, of Port Huron, in the county of St. Clair and State of Michigan, have invented a new and useful Improvement in Composition for Roofing, Paving, &c.; and I do declare that the following is a true and accurate description thereof.

The nature of this invention relates to a compound for roofing and paving purposes, which will not be affected by the elements, and which will present a slightly elastic surface, while the body is of a hard granular structure. It consists in the peculiar composition thereof, with the ingredients in or about the proportions and applied in the manner hereinafter set forth.

The liquid portion of my composition consists of equal parts of coal-tar and asphaltum boiled together. The solids are: sifted sand one barrel; calcined gypsum, eight quarts; hydraulic cement or water-lime, eight quarts; common salt, four quarts; powdered alum, two pounds. The dry ingredients should be sifted and thoroughly mixed, with perhaps the exception of the alum, which may be dissolved in the liquids when boiling.

Into the liquid I stir the dry material until the mass has the consistency of plastering mortar, when I spread it upon the roof, or wherever required, with a trowel, to the desired depth, and then I sift on top the dry compound and roll it in with a heated roller until no more of the dry material will adhere to the mass. The covering thus made soon sets, the body drying to a hard and tough mass, having a granular structure, while the skin or surface by the above treatment presents a slight elasticity if applied to a roof which is liable to be walked upon. Otherwise, as in the case of a pavement, I roll the composition as soon as spread, without the top dressing, which produces a solid mass.

In pavements the composition may be laid on a street already paved with cobble-stone, or directly upon a bed of gravel, or on such a foundation in layers of the composition and gravel, the top course of the composition having small stones, pebbles, or other hard substances embedded therein, if desired.

The composition prepared as described does not change its character under extraordinary variations of temperature, being capable of being heated to redness without combustion taking place or being softened in the slightest degree.

I claim—

The above-described composition, composed of the ingredients in or about the proportions, and applied substantially as herein specified, for the purposes set forth.

WILLIAM M. STUART.

Witnesses:
FREDERICK EBERTS,
MYRON H. CHURCH.